No. 876,351. PATENTED JAN. 14, 1908.
A. HOEDT.
MOTOR WAGON.
APPLICATION FILED APR. 5, 1907.

3 SHEETS—SHEET 1.

Witnesses.

Inventor.

No. 876,351. PATENTED JAN. 14, 1908.
A. HOEDT.
MOTOR WAGON.
APPLICATION FILED APR. 5, 1907.

3 SHEETS—SHEET 2.

Witnesses:
Max Meyer
Herm. Boyens

Inventor:
August Hoedt

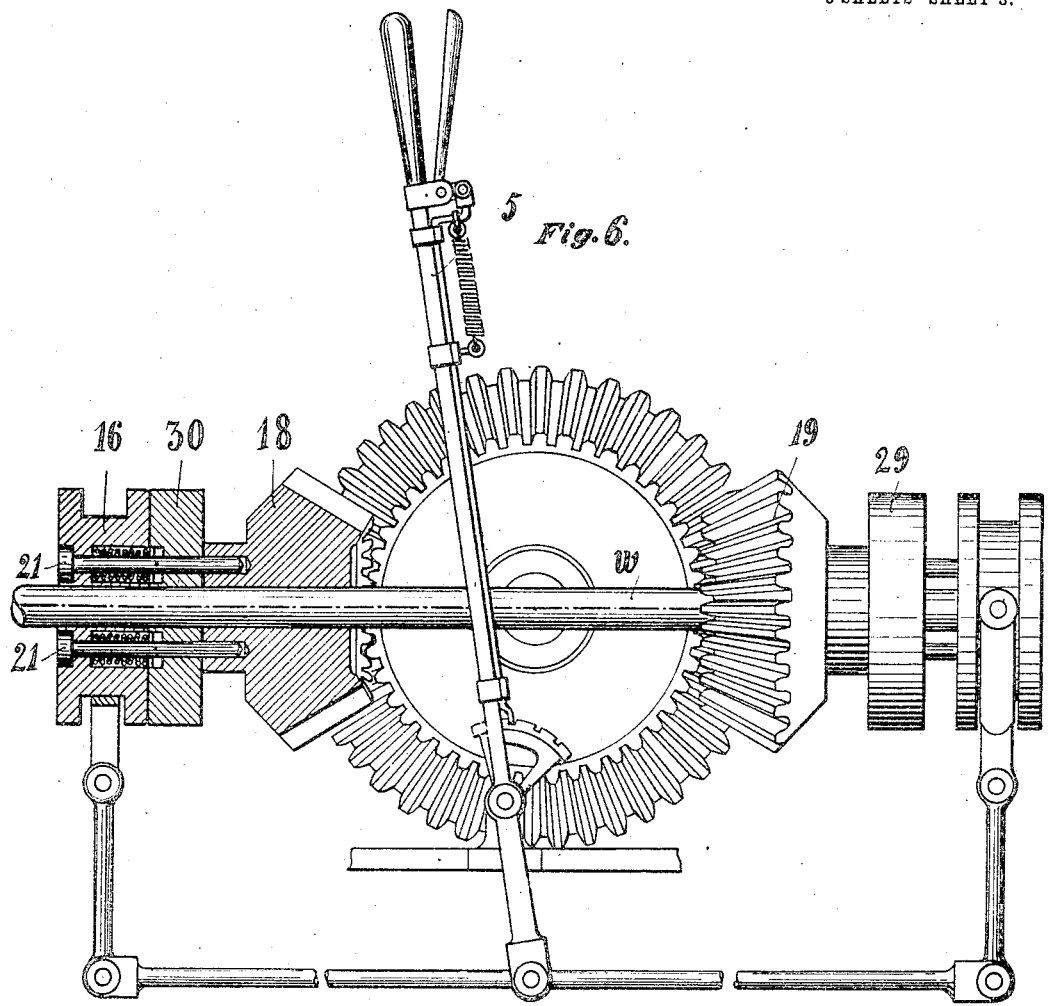

UNITED STATES PATENT OFFICE.

AUGUST HOEDT, OF PETERAWE, NEAR OBERSITZKO, GERMANY.

MOTOR-WAGON.

No. 876,351.  Specification of Letters Patent.  Patented Jan. 14, 1908.

Application filed April 5, 1907. Serial No. 366,481.

*To all whom it may concern:*

Be it known that I, AUGUST HOEDT, a subject of the German Emperor, and resident of Peterawe, near Obersitzko, Germany, have invented certain new and useful Improvements in and Relating to Motor Wagons, Carriages, and the Like, of which the following is a specification.

The present invention relates to improvements in motor wagons, carriages and cars by which the cars and the like can be driven directly in either direction, backwards or forwards, without turning round but which however is turned on the spot by turning both the front and back wheels simultaneously whereby the risk or danger of overturning is avoided.

The existing motor wagons, carriages and cars do not satisfy the claims preferred chiefly in respect of turning round, in altering the course of the cars which, owing to the driving axle or wheels being unturnable, could not take sharp curves by risk or danger of overturning. This danger is avoided in the present invention by providing for turning both the front and back axles of the carriage in the same but opposite angles in such a way that the carriage can be turned on the spot.

The accompanying drawing shows three forms of construction of the invention.

Figure 1:
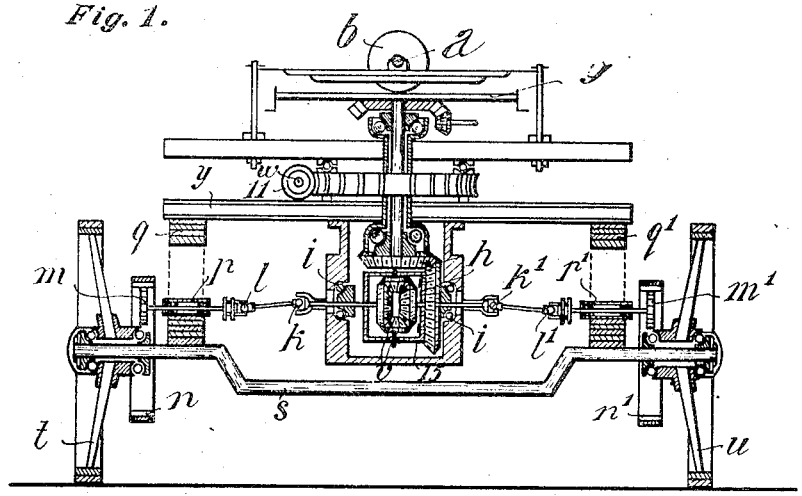
Figure 2:
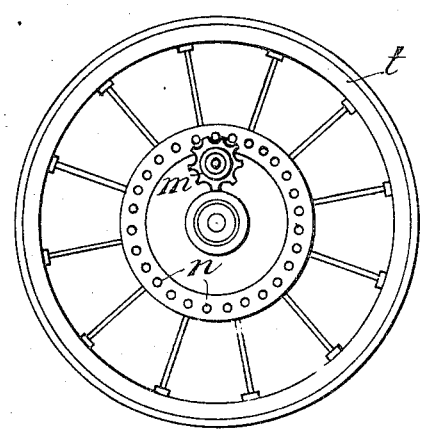
Figure 3:
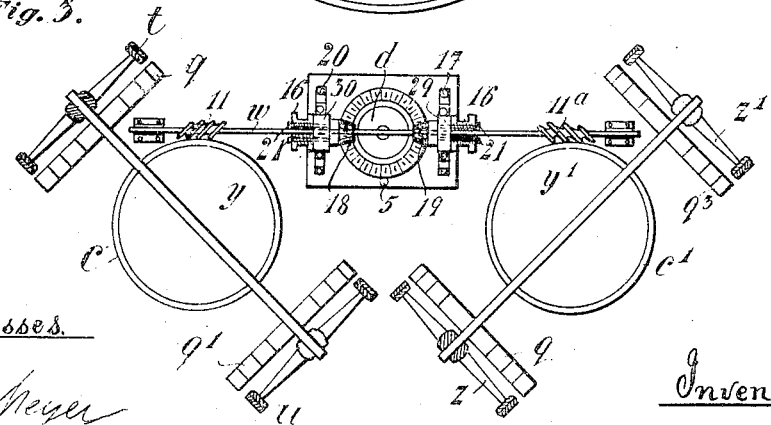
Figure 4:
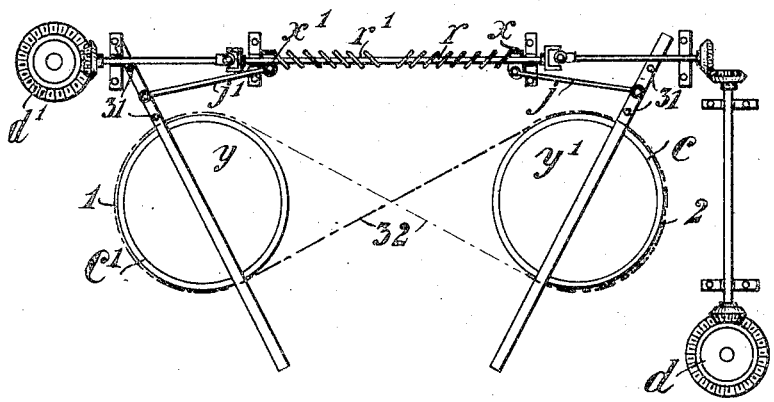
Figure 5:
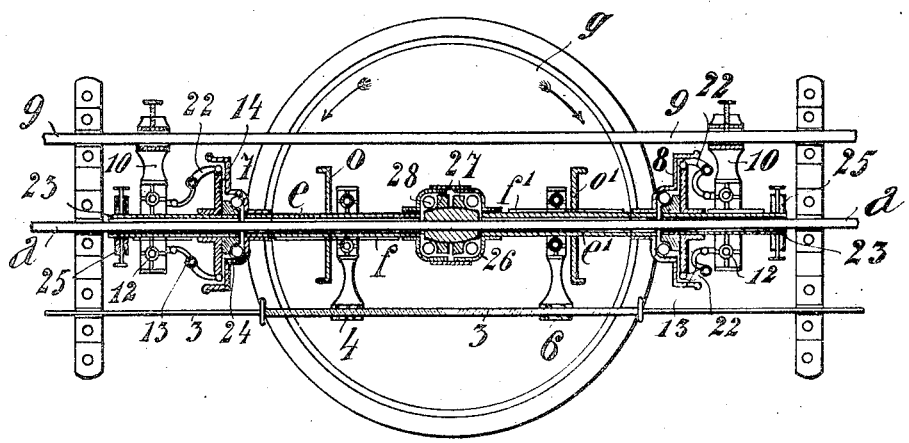

Figure 1 represents, in cross section, one of the two pair of wheels. Fig. 2 shows the wheel in which the toothed wheel is fixed. Fig. 3 shows a top-view of a steering device of the carriage, Fig. 4 represents two other forms of construction of a steering arrangement, Fig. 5 gives a second form of construction of the driving mechanism, and Fig. 6 shows the engaging and disengaging mechanism explaining the operation of lever 5 and associated parts 16 to 21.

The power of the motor is transmitted to the driving gear $h$ and to the differential mechanism $v$ and the case 15, which is supported in $i$, by the axle $a$ which bears the friction wheel $b$ which is in tangent with the friction and braking disk $g$ which is attached to the axle of the said gear; and from the case 15 two axles, which are removable and flexible by the universal joints $k$, $k^1$ and $l$, $l^1$, protrude which drive the respective wheels $t$ and $u$, the movement for which are transmitted by the said axles running in the bearings $p$, $p^1$ which are fastened with the springs $q$ and $q^1$ fixed on the axle $s$.

On the nave of the wheels $t$ and $u$ the wheels $n$, $n^1$ with the inner teeth (see Fig. 2. are rigidly fixed which, being propelled by the toothed wheels $m$ and $m^1$ which are fixed in the respective axles running in the bearings $p$, $p^1$, propel the former wheels of the carriage.

As the bogie frame $y$, which is attached to the frame of the carriage, can be turned in any direction desired by means of the worm screw 11, carried by the axle $w$ without loosing hold, the carriage is adapted to be turned on the spot without the danger of overturning due to the power of guiding being an unlimited one.

Fig. 3 shows how the bogie frames $y$, $y^1$, the springs $q$, $q^1$ and the wheels $t$, $u$ and $z$, $z^1$ are arranged and also the bogie frame rings $c$, $c^1$ having screws which are in tangent with the worm screws 11 and $11^a$.

Fig. 4 shows the second form of construction. The steering or guiding, in this case, is made by the right and the left screws $r$, and $r^1$ and by the respective nuts $x$ and $x^1$ which are connected with the movable bars $j$ and $j^1$, and as the said nuts fully catch the respective screws the threads of the latter cannot jump off. In this arrangement the axles can be bent and the turning motions can be quickly and easily changed by changing the holes 31, further there are two conical wheels $d$, $d^1$ which facilitate turnings and driving of freight wagons, chariots and the like, which, in the existing methods, can only be turned from one end, while in this arrangement the wagons can be turned and driven from either end. In the said Fig. 4 is also shown, by dotted lines, the third form of construction which, if only one turning device is necessary for turning the carriage from one end, a steel ribbon or leather strap 32 or the like is put round the rings $c$, $c^1$ of the bogie frames, which are fixed at the points 1 and 2, whereby only one axle is enough for turning both the axles of the wheels.

In the foregoing forms of construction having one turning wheel, a gearing for turning is arranged as shown in Fig. 3 between the turning or worm axle $w$. The conical wheels 18 and 19 of said gearing can be coupled with the worm axle $w$ in such a manner that the couplings can be exchanged. The conical wheels are switched or coupled by shifting the part 16 by means of the lever 5 which is actuated from the top of the carriage and in this latter action, the bolts 21 are pushed through the openings, in the affixed disk 29, into the openings in the conical wheels 19 whereby the said gearing with the said axle $w$ are coupled.

As the holes or openings in the conical wheel 19 do not always remian in the right position, the bolts 21 are shiftably arranged in the casing 16 the former of which are jerked into the holes, at the right moment, by springs. The bolts of the opposite conical wheel are then drawn into the disk 30 which turns on ball bearings 17 and 20, and the bolts can be prevented from fully coming out by any suitable means.

As the reversing of the steering device is not alone sufficient for driving the carriage in the manner described a reversing arrangement is provided for as shown in Fig. 5 consisting of an axle $a$, which is arranged over the friction and braking disk $g$, being provided with two hollow axles $e$, $e^1$ each of which has a guiding rib $f$ and $f^1$ on which the grooves of the respective friction wheels $o$, $o^1$, slide. The said friction wheels, which can be shifted outward or inwards by the left and right screws or spindle 3 and the nuts 4 and 6, have at the utmost end of each hollow axle the friction clutches 7 and 8 which are alternately coupled with the hollow axle $e$ by the removal of the bar 9 and its appurtenances 10 and 12, and also the springs 13 and parts 22 which are movable in the part 14. The part 12 is shiftable on the tube 23, on the latter of which the parts 14 and 24 are fixed, and the tube 23 is fixed on the axle $a$ by the screw 25 whereby when the bar 9 with its parts is shifted to the right side, the spring 13 presses the friction part 22 towards the edge of the socket 7 so that the latter and the hollow axle $e$ fixed in it, are carried along with the friction wheel $o$ which is shiftable on the axle $e$.

When coupled as shown in Fig. 5, the right side is set free by shifting the bar 9 towards the right side so that the parts 10 and 12 are shifted towards the same direction while the socket 8 and the hollow axle $e^1$ followed with the friction wheel $o^1$ are set free. The latter wheel now gets turned by the friction disk and the part 26 serves for fastening the ball bearings 27 and 28 to the axle $a$.

I claim:

1. In a motor carriage the combination, an axle $a$, a friction wheel $b$ on this axle, a friction disk $g$ in tangent with the said friction wheel $b$, the axle which is connected with the said friction disk $g$, the gearing $h$ running with the friction disk $g$, the casing 15 fixed to the gearing $h$, the differential mechanism $v$ in the casing 15, two axles protruding from the said casing made movable and shiftable by the universal joints $k$, $k^1$ and $l$, $l^1$ and turnably arranged in the bearings $p$, $p^1$, springs $q$, $q^1$ holding the said bearings and fastened on the axle $s$, toothed wheels $m$, $m^1$ fixed at the ends of the said axles adapted to engage with the teeth of the respective wheels $n$, $n^1$ the latter wheels being connected with the wheels $t$, $u$, two hollow axles $e$, $e^1$ on the said axle $a$ having guiding ribs $f$, $f^1$, friction wheels $o$, $o^1$ having grooves engaging with the said ribs and adapted to be shifted by the socket 4 and 6 which are sliding on the bar 3 having right and left screws, friction clutches 7 and 8 at the utmost ends of the said hollow axles, a bar 9 supported parallel to the axle $a$, arms 10 and rings 12 on this bar the rings of which are adapted to slide in a groove of the hollow axles 23 which are fastened by screws 25 on the axle $a$ and also adapted to be coupled with the said friction clutches, means for enabling the coupling consisting of the springs 13 fastened to the rings 12 adapted to press the friction part 22 against said friction clutches 7 and 8, means for steering both the pair of wheels by turning the respective axles in the same but opposite angles, substantially as shown and described.

2. In a motor carriage the combination, an axle $a$, a friction wheel $b$ on this axle, a friction disk $g$ in tangent with the friction wheel $b$, the axle which is connected with the friction disk $g$, the casing 15 fixed to the gearing $h$ the differential mechanism $v$ in the casing 15, two axles protruding from the said casing made movable and shiftable by the universal joints $k$, $k^1$ and $l$, $l^1$ and turnably arranged in the bearings $p$, $p^1$, springs $q$, $q^1$ holding the said bearings and fastened on the axle $s$, toothed wheels $m$, $m^1$ fixed at the ends of the said axles adapted to engage with the teeth of the respective wheels $n$, $n^1$ the latter wheels being connected with the wheels $t$, $u$, two hollow axles $e$, $e^1$ on the said axle $a$ having guiding ribs $f$, $f^1$, friction wheels $o$, $o^1$ having grooves engaging with the said ribs and adapted to be shifted by the nuts 4 and 6 which are sliding on the bar 3 having right and left screws, friction clutches 7 and 8 at the utmost ends of the said hollow axles, a bar 9 supported parallel to the axle $a$, arms 10 and rings 12 on this bar the rings of which are adapted to slide in a groove of the hollow axles 23 which are fastened by screws 25 on the axle $a$ and also adapted to be coupled with the said friction clutches, an axle $w$, the right and left screws 11, 11$^a$ on this axle, bogie frames $y$, $y^1$ provided with rings $c$, $c^1$ engaging the said screws, conical wheels 18, 19 having holes loosely situated on said axle $w$, rings 29, 30 having holes fixed on said axle, the casing 16 loosely situated on the said axle and having springy bolts 21 which are adapted to go through the said rings 29, 30 into the holes of the conical wheels 18, 19, the lever 5 adapted to shift said casings 16 and to remove the bolts 21 from the conical wheels 18, 19, and means for turning the conical wheels consisting of a conical wheel $d$ turnable by hand, substantially as shown and described.

AUGUST HOEDT.

Witnesses:
HENRY HASPER,
WOLDEMAR HAUPT.